June 24, 1941.   J. C. SMITH   2,246,543
RAILROAD CAR FOR TRANSPORTING VEHICLES
Filed Nov. 28, 1938   5 Sheets-Sheet 1
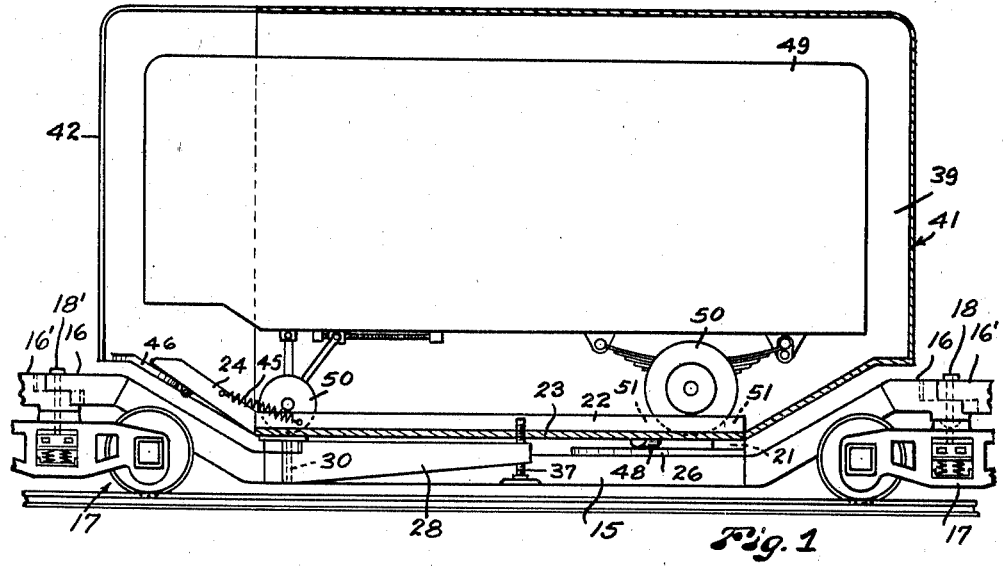
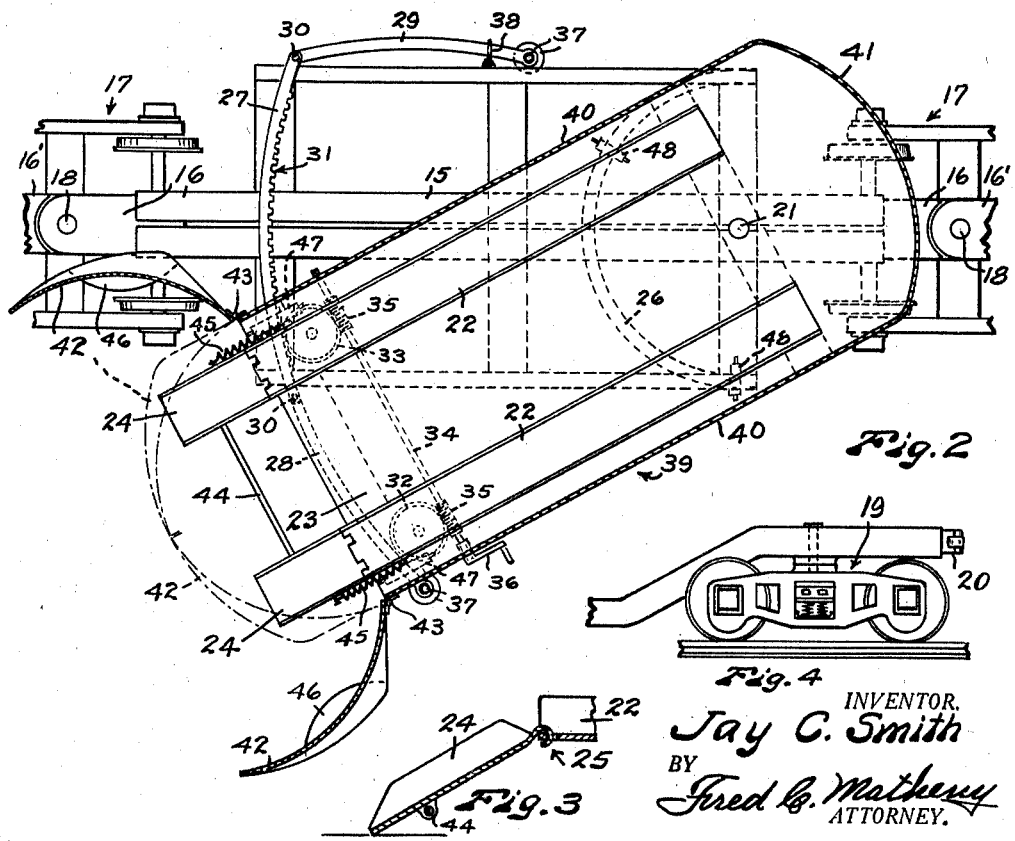
INVENTOR.
Jay C. Smith
BY Fred C. Matheny
ATTORNEY.

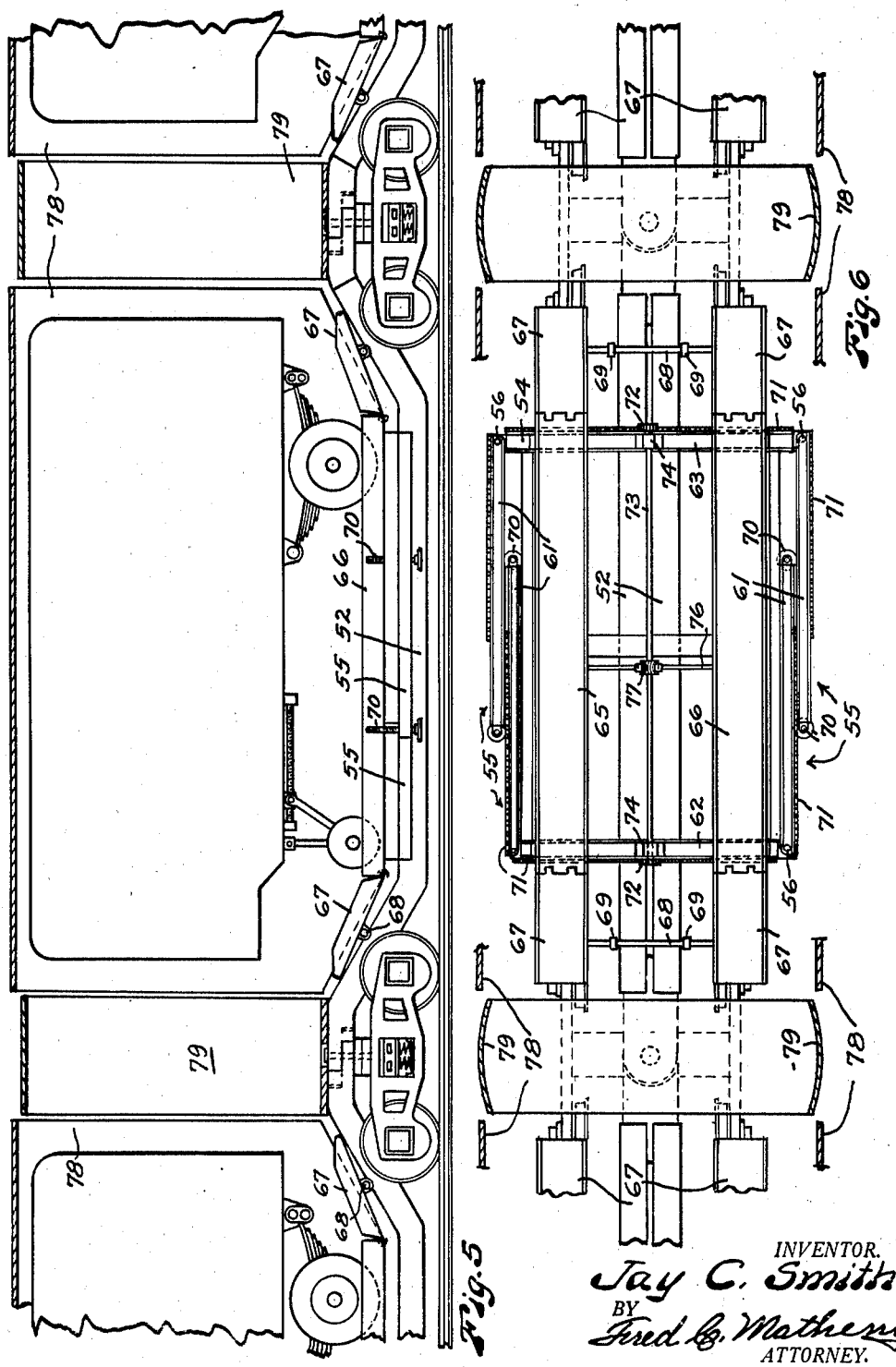

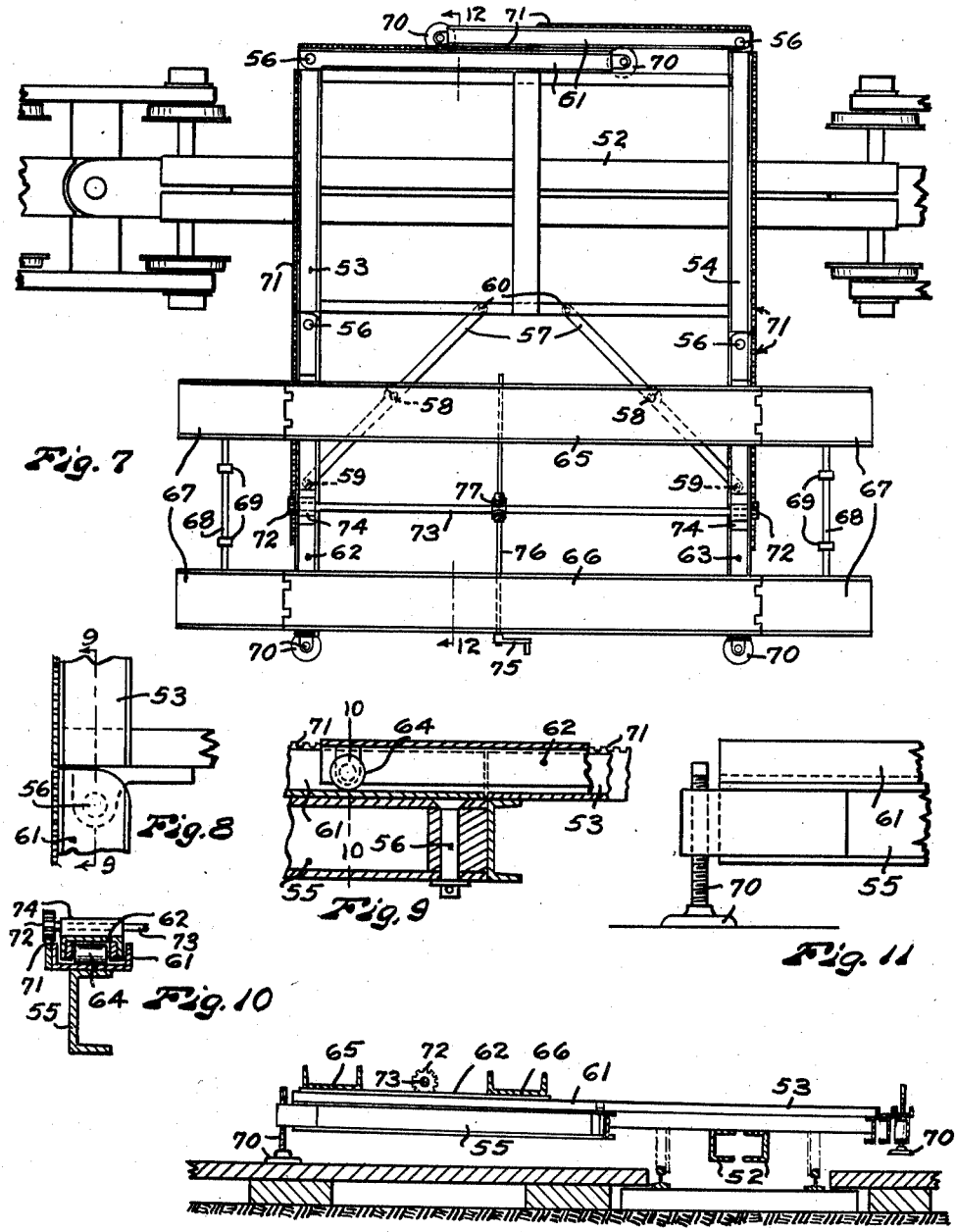

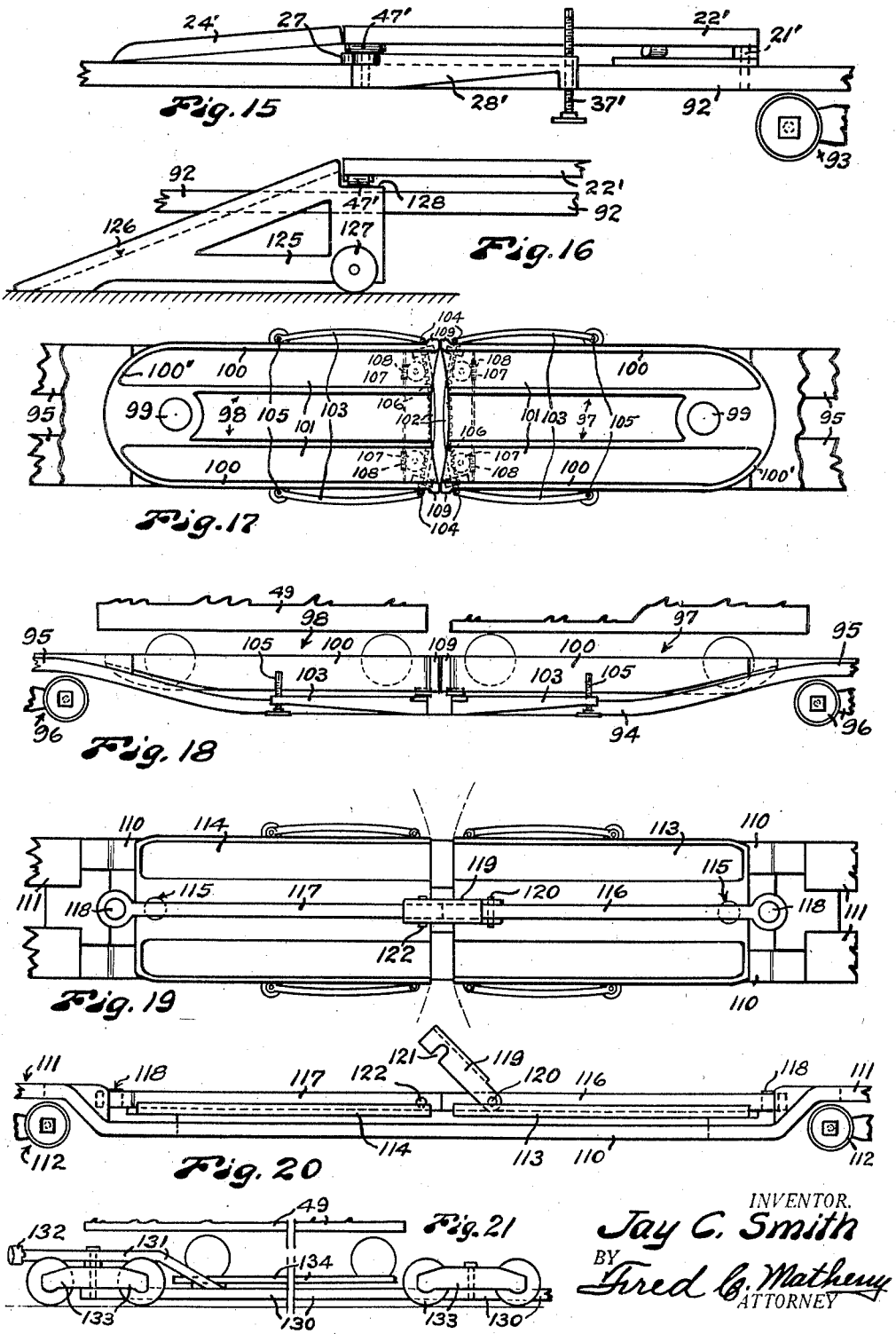

Patented June 24, 1941

2,246,543

UNITED STATES PATENT OFFICE 2,246,543

RAILROAD CAR FOR TRANSPORTING VEHICLES

Jay C. Smith, Seattle, Wash.

Application November 28, 1938, Serial No. 242,836

12 Claims. (Cl. 105—159)

This invention relates to railroad cars for transporting vehicles and is a continuation in part of my application Serial No. 117,633, filed Dec. 24, 1936.

An object of this invention is to provide a car particularly designed to receive and transport trailers of a type used on streets and highways.

Another object of this invention is to provide an articulated train made up of a plurality of cars each having a drop center portion provided with loading and unloading means facilitating side loading and unloading and each having two raised end portions supported on railroad trucks, one truck being provided in each instance for the support of two adjacent or articulated car ends.

Another object of this invention is to provide an articulated train of this type in which the upright pivotal connections between the adjacent ends of the cars are positioned substantially over the centers of the trucks so that each truck supports the ends of two adjacent cars.

Another object of the invention is to provide a drop center railway car in which the center portion of the frame is dropped to a position a minimum distance above the roadbed thereby facilitating loading and unloading from the side, keeping the center of gravity of the load always at a minimum height and making it possible to utilize substantially the entire length of the railway car for load carrying purposes, due to the fact that the wheel portions of a trailer will occupy the drop center portion of the car and the end portions of the trailer which project beyond the wheels will overhang the higher end portions of the car which are supported on the car trucks.

Another object of the invention is to provide a drop center car having side loading trailer or vehicle supporting means mounted thereon whereby trailers or vehicles may be loaded from the side of the car with a minimum of loading equipment and without requiring any uncoupling or switching of the cars.

Another object of the invention is to provide a drop center car having pivotally mounted vehicle supporting means adapted to receive or discharge a vehicle from the side of the car and adapted to support the vehicle lengthwise of the car at all times except during the loading and unloading of the same.

Another object of the invention is to provide loading and unloading devices that are suitable for use with a car frame in which the center portion is straight and on the same level as the end portions thereof.

Another object is to provide a drop center car frame having reinforcing means for carrying the longitudinal compression or both the longitudinal compression and tension so that the drop center portion of the car frame will be relieved of much longitudinal compression or of much longitudinal compression and tension and will function chiefly as a carrier for the vertical load. It is important that the reinforcing means should carry much of the longitudinal compression or thrust as the cars are frequently subjected to hard bumping and heavy thrusts which tend to deflect the drop center frame downwardly in the same direction as the load tends to deflect it.

Other and more specific objects of the invention will be apparent from the following description taken in connection with the accompanying drawings.

In the drawings Fig. 1 is a fragmentary view partly in side elevation and partly in cross section of an articulated train constructed in accordance with this invention showing one entire car and fragments of two other cars and showing a trailer positioned on one car.

Fig. 2 is a fragmentary plan view of the same, with parts in section, the trailer being omitted and the loading platform being shown in a loading and unloading position.

Fig. 3 is a fragmentary sectional detail showing a loading ramp in a lowered position.

Fig. 4 is a fragmentary side elevation of one end portion of a car used at the end of an articulated train of this type.

Fig. 5 is a fragmentary side elevation with parts in section of a modified form of the invention.

Fig. 6 is a plan view of the train shown in Fig. 5, the trailers being omitted and fragments only of the cars being shown.

Fig. 7 is a plan view similar to Fig. 6, except that a loading platform is shown in loading and unloading position.

Fig. 8 is a fragmentary plan view on a larger scale of a pivot means for one of the extension track members.

Fig. 9 is a sectional view substantially on broken line 9—9 of Fig. 8, showing a portion of a loading platform in addition to the parts shown in Fig. 8.

Fig. 10 is a fragmentary sectional view substantially on broken line 10—10 of Fig. 9.

Fig. 11 is a detached elevation of an adjustable support for the outer end of a track member.

Fig. 12 is a somewhat diagrammatic view substantially on broken line 12—12 of Fig. 7, illustrating a manner of tilting transverse track means to facilitate the movement of a loading platform thereon.

Fig. 15 is a side elevation showing loading and unloading means of the type disclosed in Figs. 1, 2, 3 and 4 applied to a car with a straight frame.

Fig. 16 is a fragmentary view in side elevation of a modified form of the device shown in Fig. 15 in which an inclined approach and support for a loading platform are constructed separately from the loading platform and the car, and showing the end of the loading platform supported on the approach.

Fig. 17 is a fragmentary plan view of a modified form of drop center car provided with two loading platforms for the reception of two trailers and having longitudinally extending reinforcing means for withstanding stresses longitudinally of the car.

Fig. 18 is a side elevation of the devices shown in Fig. 17.

Fig. 19 is a fragmentary plan view, with parts omitted, of another modified form of drop center car provided with two loading platforms and with a different type of longitudinal reinforcing means from that shown in Fig. 17.

Fig. 20 is a side elevation of the devices shown in Fig. 19.

Fig. 21 is a side elevation of another modification, showing the invention applied to a straight underslung car frame.

Like reference numerals designate like parts throughout the several views.

Figure 13:
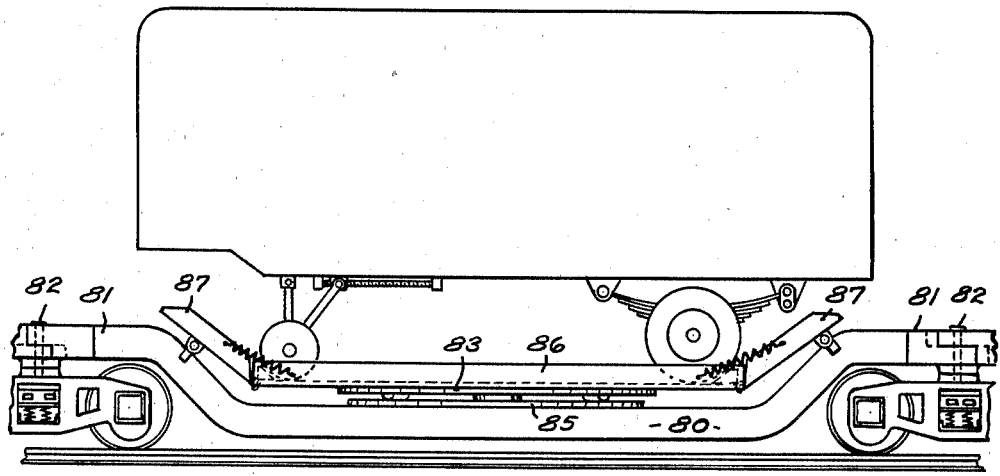
Fig. 13 is a side elevation of another modified form of the invention.

In Figs. 1 to 4 of the drawings I show a complete car frame comprising a drop center portion 15 and two raised end portions 16 extending over and supported on two trucks 17. End portions 16' of adjacent car frames are also supported on the car trucks 17 and are articulated by upright pivot means 18 with the end portions 16. The upright pivot means 18 are positioned substantially above the centers of the car trucks 17 whereby each car truck 17 supports the ends of two adjacent car frames. In this way an articulated train comprising any desired number of car frames may be provided. In an articulated train of this nature it is necessary to provide a separate truck 19 for the outer end of the car at each end of the train, as shown in Fig. 4. Also a coupler means 20 of conventional type may be provided on the car frame at each end of the train to permit an engine or another car to be coupled onto either end of the train. The usual railway car is provided with, at least, two sets of trucks making it a self contained unit which may be uncoupled and coupled and switched into and out of trains at will. By providing for loading the trailers directly onto and off of the train and by providing for the side loading and unloading of such trailers it is possible to obviate substantially all need for switching thus making practical an articulated train in which only one railway truck per car is used for all cars except the two end cars of the train. Where the cars are made to receive and carry only one trailer the cars are usually shorter than the ordinary railway car and one truck per car is ample to carry the load.

The drop center portion 15 of the car frame shown in Figs. 1, 2 and 3 has a loading platform pivotally mounted thereon by a pivot 21 located near one end of said platform. The loading platform comprises two longitudinally extending wheel supports 22 of channel shaped cross section connected by suitable frame means as a floor 23 and provided at one end with hingedly connected end ramps 24. One means for hinging the end ramps 24 to the wheel supports 22 is shown at 25 in Fig. 3. An annular track member 26 is preferably provided concentric to the pivot 21 to assist in supporting and steadying the pivoted end portion of the loading platform. The loading platform is adapted to be moved angularly on the pivot 21 from a carrying position parallel with the car frame to an angular position in which the freely movable end portion of said platform is selectively positioned at either side of the car frame so that a wheel supported vehicle may be moved onto or off of said platform. An arcuate track member 27 is secured to the car frame beneath the movable end portion of the loading platform. Track members 28 and 29 respectively, are connected by vertical pivot means 30 with opposite end portions of the track member 27. An arcuate gear rack 31 is connected with the track member 27 and two gear wheels 32 and 33 are rotatably mounted on the loading platform and positioned to mesh with the arcuate gear rack 31. A transverse shaft 34 is provided with worms 35 meshing with the gear wheels 32 and 33 for driving said gear wheels. A crank member 36 is preferably provided for rotating the transverse shaft 34. The crank member 36 may be detachable if desired. When the loading platform is moved to the angular loading or unloading position, shown in Fig. 2, the movable portion of said platform is supported on one of the swinging extension track members 28 and 29 which are connected by pivot 30 with the respective end portions of the fixed track member 27. Each extension track member 28 and 29 is provided at its outer end with a vertically adjustable screw or jack member 37. One of the extension track members 28—29 is provided at each side of the car so that the movable end portion of the loading and unloading platform may be positioned at either side of the car for loading or unloading from either side. When not in use the swinging track members are folded into or alongside of the car frame in the position occupied by the track member 29 in Fig. 2. Any suitable means, as a hook 38, may be used to secure the extension track member in folded position.

Also in the embodiment of the invention disclosed in Figs. 1 and 2, a car body is preferably secured to the loading and unloading platform. This car body is rigidly secured to the marginal portions of the loading and unloading platform. It preferably comprises rigid side walls 40, a rigid end wall 41 at the pivoted end portion of the loading and unloading platform and swinging doors 42 at the movable end portion of the loading and unloading platform. The swinging doors 42 are mounted on hinges 43 and may occupy positions substantially as shown in Fig. 2 when open. When these doors are closed they will occupy the positions shown by dot and dash lines in Fig. 2. Preferably the end wall 41 and doors 42 are curved to provide a streamline effect and reduce air resistance.

Preferably the end ramps 24 of the wheel supporting members 22 are connected with each other by transverse connecting means 44. These ramps 24 are also preferably provided with counterbalancing means which helps to lift the weight of said ramps but preferably is not sufficient to lift the ramps or to hold them elevated without assistance. Springs 45 are shown for this counterbalancing means but other devices may be used. When the ramps are raised into the position shown in Fig. 1, and when the doors 42 are closed the ramps will preferably rest on shelf means 46 provided at the bottom portions of the doors.

The worms 35 and gearwheels 32, 33, meshing with the arcuate gear rack 31 constitute a self locking means for holding the loading platform and car body 39 in a position in longitudinal alignment with the car frame or in any desired angular position. One of the gearwheels 32 or 33 is always in mesh with the gear rack 31 for all angular positions of the loading platform and when the loading platform is in longitudinal alignment with the car frame both of said gear wheels are in mesh with the gear rack 31.

I have shown roller means 47 on the loading platform for engagement with track members 27, 28 and 29 and similar roller means 48 on the loading platform for engagement with track member 26.

In the operation of the apparatus shown in Figs. 1, 2 and 3, the loading platform and car body will ordinarily occupy a position above the drop center portion 15 of the car frame and in longitudinal alignment with the car frame. When a trailer 49 or other vehicle is to be loaded onto or unloaded from a car the extension track member 28 or 29 at the side of the car from which the loading or unloading is to take place is first extended and the adjustable screw 37 at the outer end thereof properly adjusted to support the same. The shaft 34 is then rotated to swing the loading platform and car body in the desired angular direction into a position as shown in Fig. 2. The doors 42 are then opened, the ramp members 24 lowered into the position shown in Fig. 3, and the trailer 49 moved up over the ramp members 24 onto the loading platform or down over said ramp members off of the loading platform. After a trailer has been unloaded from or loaded onto the loading platform the ramps 24 are raised, the doors 42 closed, the shaft 34 rotated to move the loading platform back into longitudinal alignment with the car frame and the extension track member 28 or 29 folded. The loading platform will always be in longitudinal alignment with the car frame when the train is in motion and will only be turned into an inclined loading and unloading position when the train is stopped.

When a trailer 49 is positioned on the loading platform the trailer wheels 50 will rest on the wheel supports 22 and will preferably be blocked by blocks 51 to prevent movement of the trailer on the supports 22.

The trailer 49 which ordinarily will be used in connection with cars of this type has the usual wheels 50 positioned far enough apart so that they will rest on the wheel supporting members 22. The ends of the trailer body preferably overhang the trailer wheels, as shown in Fig. 1. These overhanging ends are elevated sufficiently to clear and overhang the elevated end portions 16 of the car frame and in this way space is utilized to the best advantage and a minimum amount of space is wasted.

In Figs. 5 to 12 inclusive, I have shown a modified form of the invention in which a loading platform is movable transversely of a car frame to permit loading and unloading from the side of the car. In said Figs. 5 to 12 a drop center portion 52 of a car body is provided with preferably two transverse track members 53 and 54 positioned near the opposite ends of the drop center portion. I have shown these track members as formed of channel bars. Four extension track members 55 are provided for cooperation with the track members 53 and 54. Each of the four extension track members 55 has one end pivotally mounted on an upright pivot member 56 adjacent an end of one of the track members 53 or 54. When these extension track members 55 are in use for loading or unloading purposes they are extended outwardly from the side of the car in prolongation of the track members 53 and 54. When said extension track members are not in use for loading and unloading purposes they are folded alongside of the car as shown at the upper side of Fig. 7. It will be noted that the end portions of the track members 54 overhang the sides of the car frame 52 a short distance while the end portions of the track member 53 are substantially flush with the sides of the car frame. The pivot members 56 are positioned adjacent the respective ends of the track members 53 and 54 with one pivot member 56, on each side of the car further away from the car frame than the other pivot member. This makes it possible to fold the extension frame members 55 snugly against the car frame when they are not in use. A folding diagonal brace member 57 is preferably provided in connection with each extension track member 17. Each folding diagonal brace member 57 comprises two sections connected together by pivot means 58. Each brace member 57 has one end pivotally connected with an extension track member 55 by pivot means 59 and the other end pivotally connected with the side of the car frame 10 by pivot means 60. Each extension track member 55 is preferably a channel bar positioned with the channel side of the bar toward the adjacent brace member 57 so that the brace member 57 will be positioned within the channel when it is folded.

When the extension track members 55 are in extended position they are in substantial alignment with the track members 53 and 54. Channel bars 61 are supported on the extension track members 55 with their channel sides uppermost and their bottom portions flush with the bottom portions of the channel bar track members 53 and 54.

A vehicle supporting means is movably mounted on the track means 53, 54, 55 and 61. This vehicle supporting means comprises two channel bars 62 and 63 interfitting the track members 53, 54, and 61. Rolling contact antifriction bearing means 64 is preferably provided between the channel bars 62 and 63 and the track members 53, 54, and 61 to provide for smooth and easy operation. Two channel shaped wheel receiving members 65 and 66 are secured to the channel bars 62 and 63 so that they extend parallel with the car frame 52. The wheel receiving members 65 and 66 and channel members 62 and 63 form the loading platform or vehicle supporting means whereon a trailer 49 or any other vehicle may be supported. Preferably a ramp member 67 like the ramp members 24, hereinbefore described, is pivotally connected with each end of each wheel receiving member 65 and 66 to serve as an inclined approach for the wheels of a trailer or vehicle which is being loaded onto or off of the members 65 and 66. The two ramp members at each end of the wheel receiving members are preferably connected together as by cross rod means 68 secured to the ramp members. Lugs or stops 69 may be secured to the cross rods 68 far enough apart so that they will fit on opposite sides of the car frame and prevent sidewise movement of the loading platform when it is properly positioned on the car.

The outermost end of each extension track member 55 is supported on a vertically adjustable support 70. In addition to providing a supporting means these adjustable supports 70 provide a means for varying the inclination of the extension track members 55 and track members 53 and 54 to facilitate moving the loading platform in either direction. By imparting a desired incline to the extension track members 55 and track members 53 and 54 the loading platform with a load thereon may be caused to move very easily either onto or off of a car. The adjustable supports 70 on both sides of the car frame may be used to impart an inclination to the track members, as for instance, the supports 70 of the extension track members 55 shown in a folded position in Figs. 7 and 12 may be used to exert a lift for the purpose of tilting the car frame and track members to cause the loading platform to move more easily toward the other side of the car.

Means are provided for transversely moving the loading platform and controlling the movement of the same. This means preferably consists of two rack bars 71 secured alongside of the respective track members 53 and 54 and extension members 55. Two pinions 72 mesh with the rack bars 71. The pinions 72 are secured to a shaft 73 which extends longitudinally of the loading platform and is journaled in bearings 74 on said platform. The shaft 73 may be rotated in either direction by crank means 75 on a transverse shaft 76 which is connected by gear means 77 with the shaft 73. In Figs. 5 and 6, I show car bodies 78 supported by the loading platform and having open ends adapted to register with vestibule compartments 79 which are supported above the trucks.

Figure 14:
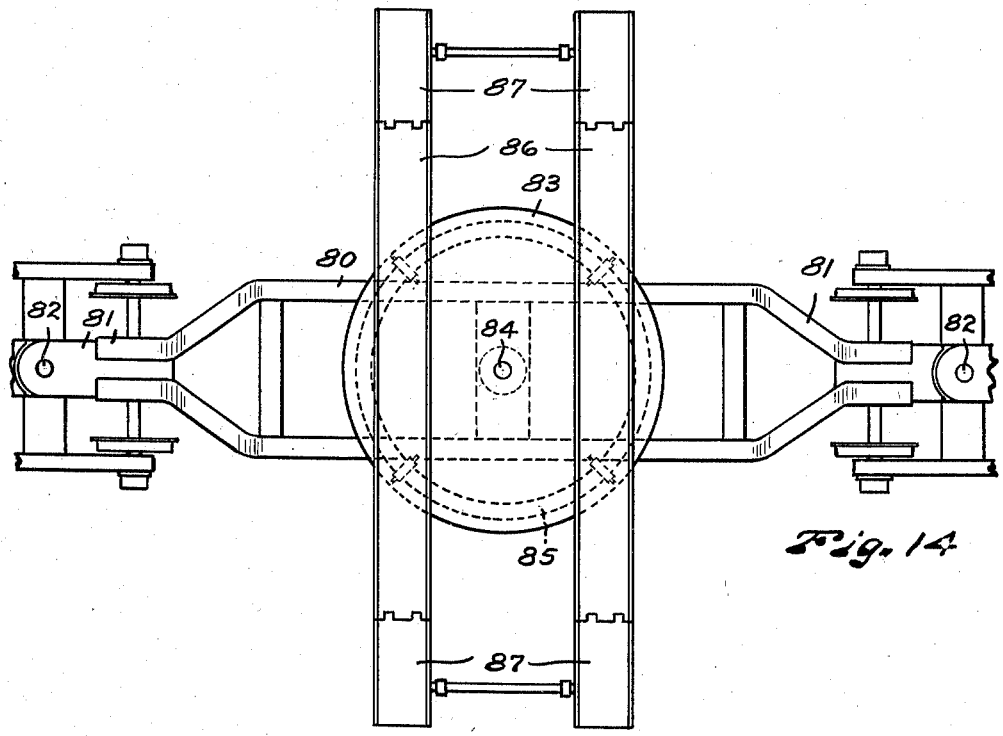
Fig. 14 is a plan view of the devices illustrated in Fig. 13, showing a loading platform in a loading and unloading position.

In Figs. 13 and 14, I have shown another modified form of the invention in which each car comprises a car frame which is wider than the car frames shown in the preceding figures and has a drop center portion 80 and raised end portions 81. The raised end portions 81 are each articulated with the end portions of adjacent cars by pivot means 82 and said raised end portions are supported on trucks 83 each truck being common to the adjoining ends of two cars.

The drop center portion 80 of the car frame has a loading platform 83 which is mounted on a central pivot 84 and supported on a circular track 85 whereby it may be turned like a turntable. Two wheel receiving members 86 of channel shaped cross section are mounted on this loading platform 83. A ramp member 87 is hinged to each end of each member 86. Preferably a car body 88 similar to the car body shown in Figs. 1 and 2, is secured to said loading platform so as to turn therewith. The car body and loading platform for supporting the vehicle normally occupy a position parallel with the car frame as shown in Fig. 13. When a trailer 49 is to be loaded or unloaded these parts are turned into a position at an angle to or substantially crosswise of the car frame as shown in Fig. 14. The loading platform portions which serve as a turntable are easily moved rotatively and may be manually moved between a position parallel with the car frame and a position substantially transverse to the car frame. No swinging or extensible track members are required in connection with the devices shown in Figs. 13 and 14.

When the loading platform and car body are positioned with the wheel receiving members 86 parallel with the car frame lugs 89 on cross bars 90, which connect the two ramp members 87 at each end of the loading platform, will engage with the car frame and prevent angular displacement of the loading platform and car body.

In all embodiments of the invention hereinbefore described when a trailer is positioned on a car the wheels of said trailer are positioned within the depressed or drop center portion of the car frame and the overhanging ends of the trailer which project beyond the trailer wheels overhang the raised end portions of the car frame. The trailer thus extends throughout the major portion of the length of the car frame and utilizes a very large portion of the available space on the car. If an individual truck is provided at each end of each railway car it necessitates a much longer elevated end portion of each car and results in more unused space because it is not possible to utilize this longer space on the car as efficiently as the space on the shorter elevated end portions of my car frames can be utilized due to the fact that the length of overhang of the trailers is limited. The provision of longer cars, as will be required if two trucks are provided for each car, necessitates increased weight and results in a less efficient construction.

In Fig. 15, I have shown a car frame 92 which is straight and is not of the drop center type. I have shown a fragment of a car truck 93 at one end of this frame 92. The car trucks 93 may support only the frame 92 or they may support the adjacent ends of two cars frames to provide an articulated train structure, as shown in the preceding figures. On the car frame 92, I provide loading and unloading means similar to that shown in Figs. 1 to 4. This loading and unloading means comprises a platform 22', fulcrumed on a pivot 21', which pivot is positioned near one end of the platform 22'. The other end of the platform 22' is supported on a cross member 27', when the platform 22' is parallel with the car frame, and when the platform is turned to one side of the car frame it is supported either on an extension member 28', which is shown in Fig. 15, or on a similar extension member, not shown, on the other side of the car frame. The parts 21', 22' and 28' above mentioned correspond to the parts 21, 22 and 28 of Figs. 1 to 4 and are similarly mounted and operated, except as hereinafter set forth. Ramp members 24' are pivotally secured to the forward end portion of the platform 22' and are similar to the ramp members 24 of Figs. 1 to 4, except that they are longer, due to the fact that the frame 92 is a straight frame and is further above the ground than the frame 15 of Figs. 1 and 2. When these ramps are not in use they may rest on the car frame 92 substantially in prolongation of the platform 22'. The screw member 37' for supporting the outer end of the swinging support 28' is necessarily longer than the corresponding screw member 37 shown in Figs. 1 and 2. The means for moving the platform shown in Fig. 15, is not shown but it may be similar to the platform moving means shown in Figs. 1 and 2. The operation of the mechanism shown in Fig. 15, is similar to the operation of the mechanism shown in Figs. 1 to 4 and hereinbefore described.

If desired the ramp members 24' and the extension track means 28', 37' shown in Fig. 15 may be dispensed with and a special support and approach for the loading platform may be provided at each location where loading and unloading is to be done. This special support and approach will not be a part of the car or train. One movable support and approach of this nature is shown in Fig. 16, and comprises a frame 125 affording an inclined approach 126 of sufficient length so that a trailer may be conveniently and safely moved up and down the same. The front end of the frame 125 may rest directly on the ground and the rear end of the same is preferably supported on wheels 127, only one of which is shown. The frame 126 has a shelf portion 128 thereon on which rollers 47' on the end portion of the loading platform 22' are supported and will roll when the loading platform is positioned at one side of the car or is being moved to or from the loading and unloading position. In the use of the devices shown in Fig. 16, the inclined support and approach is placed in the proper position and at the proper angle alongside of the car, when loading or unloading is to be done, and the movable end of the loading platform is moved outwardly onto said support and approach and is supported thereby while the load is being moved onto or off the platform.

Obviously if a fixed platform is provided at the same height as the shelf 128 the movable end of the loading platform 22' may be moved out onto said fixed platform the rollers 47 rolling on the fixed platform.

Figs. 17 and 18 show an adaptation of the invention in which a drop center car frame is reinforced by compression means which takes the thrust on the car frame but does not interfere with placing the loading platform at the lowest possible level. Also this form of the invention provides for carrying two trailer vehicles 49 on each car. In said Figs. 17 and 18 numeral 94 designates a drop center car frame having elevated end portions 95 supported, either individually or jointly with another car frame, on trucks 96. Two loading and unloading platforms 97 and 98 are mounted on the drop center portion of the car frame with their adjacent ends free to move transversely of the car frame and their other ends pivoted on pivot means 99. Preferably the pivot means 99 is of very strong and substantial construction as the thrust or compression on the car frame is transmitted through this pivot means. Each side portion of each platform 97 and 98 is in the form of a strong and substantial thrust member 100 capable of withstanding the thrust or compression to which the car is subjected. The upper edges of these thrust members 100 may terminate substantially in the plane of the top surface of the raised end portions 95 of the car frame. The wheels of the trailer vehicles are positioned between the two side thrust members 100 when on the platform and rest in wheel supports 101. Consequently the use of these thrust members 100 does not necessitate raising the trailer vehicles above the minimum necessitated by the drop center frame. Each platform 97 and 98 is preferably provided at the pivoted end with an arcuate flange portion 100' that is integral with the side thrust members 100. The means herein shown for supporting the platforms 97 and 98 in all positions and the means for moving and holding said platforms are substantially the same as the platform supporting and moving and holding means shown in Figs. 1 to 4. This supporting and moving and holding means comprises a fixed transverse arcuate support 102 and two extension supports 103 swingingly mounted on pivots 104 and having screw means 105 for supporting the outer ends thereof. A gear rack 106 on each fixed support 102 is engaged by gear wheels 107 on the adjacent platform. The gear wheels 107 are operated by worms 108. This means serves to move and hold the platforms. The adjacent ends 109 of the compression or thrust members 100 are preferably thickened as shown in Fig. 17 and said ends abut tightly against each other when both platforms 97 and 98 are aligned with the car frame whereby said thrust members cooperate to form a compression member extending from one elevated end portion of the car frame to the other. The adjacent ends of the loading platforms 97 and 98 are concave shape to afford clearance so that said platforms may be moved one at a time. This provides a car frame in which the drop center frame portion 94 carries the load and vertical stresses and the longitudinal compression and thrust is taken chiefly by the compression members 100 in combination with the pivot means 99 and the elevated end portions 95 of the car frame, the reinforcing means acting as a compression member in a truss with the lower portion of the frame to support the vertical load and said reinforcing means acting as a compression member to withstand the longitudinal stresses.

Figs. 19 and 20 show another adaptation of this invention in which a drop center car frame is reinforced by compression means which takes the thrust on the car frame but does not interfere with the placing of the loading platform at the lowest possible level. This adaptation also provides for the carrying of two trailers on each car. In said Figs. 19 and 20 numeral 110 designates a drop center car frame having elevated end portions 111 supported either individually or jointly with another car frame on trucks 112. Two loading and unloading platforms 113 and 114 are mounted on the drop center portion 110 of the car frame with their adjacent ends free to move transversely of the car frame and their outer ends pivoted on pivot means 115. The means for supporting and moving the platforms 113 and 114 may be similar to that shown in Figs. 1 to 4 and Figs. 17 and 18 hereinbefore described and is not set forth in detail. Reinforcing devices independent of the platforms 113 and 114 are provided for resisting both compression and tension on the car frame. These reinforcing devices are in the form of two straight members 116 and 117 preferably of steel capable of resisting both tension and compression, pivoted at their outer ends on pivots 118 which can be coaxial with the pivots 115, but are not so shown. The members 116 and 117 may swing independently of the platforms. The inner end portions of these members 116 and 117 are adapted to abut together to resist compression and are provided with means for securing said two abutting ends together and for preventing sidewise disalignment of the two members 116 and 117. This means may be in the form of a connector member 119 of U shaped cross section connected by a pivot 120 with one member 116 and adapted to fit over the abutting member 117 and having a notch 121 adapted to fit over a pin 122 in the member 117. The wheels of the trailers straddle the members 116 and 117 when the trailers are on the platforms 113 and 114. The members 116 and 117 act like toggle links to take up slack and play when they are moved into alignment with each other. In operation these members 116 and 117 withstand compression, and, if locked together as shown, will also act as tension means and thus relieve the drop frame portion of longitudinal stresses. Members 116 and 117 will be angularly moved with platforms 113 and 114 in loading and unloading trailers and the trailers will straddle the members 116 and 117 when on the platforms and when being moved onto and off of said platforms.

Obviously car bodies, similar to car body 39, Figs. 1 and 2, may be provided on the loading platforms 97, 98, 113 and 114.

Fig. 21 shows a straight car frame 130 of underslung type in which the frame is positioned in close proximity to the road bed and extends beneath the axles of car trucks 133. The car frame 130 shown in Fig. 21 has an elevated auxiliary frame member at one end to support a car coupler 132 at standard height. At the other end the car frame 130 extends beyond the adjacent car truck 133 and may be directly articulated with a corresponding frame, not shown, of another car. For articulated trains it may be convenient to provide one of the elevated frames 131 at the outer end of the car at each end of the train but the straight frames 130 may be directly articulated between the several cars of the train. The frame 130 has a loading platform 134, preferably similar to one of the loading platforms of Figs. 1, 17 or 19, for the reception thereon of a trailer.

The foregoing description and accompanying drawings clearly disclose certain preferred embodiments of my invention but it will be understood that this disclosure is merely illustrative and that such changes may be made as are within the scope and spirit of the following claims.

I claim:

1. In a railroad car, a drop center car frame portion; movable loading platform means operatively disposed on said drop center car frame portion; track means on said drop center car frame portion movably receiving said loading platform; folding track extension members secured to the sides of said drop center car frame portion and foldable alongside of said drop center car frame portion and adapted when extended to support portions of said loading platform at the side of said drop center car frame portion when said portions of said loading platform are moved into loading and unloading position at the side of the car and supporting means for the outer end portions of said folding track extension members.

2. In a railroad car, a car frame comprising two end frame portions supported on car trucks and a drop center frame portion positioned between said two end frame portions in a plane below said two end frame portions; track means comprising transverse track members on said drop center frame portion and folding extension track members pivotally connected with the end portions of said transverse track members movable between positions alongside of said drop center frame portion and positions in prolongation of said transverse track members; supporting means for the outer end portions of said folding track extension members; a loading platform and platform supporting means connected with said loading platform movable on said transverse track members and movable on said extension track members when said extension track members are in extended position.

3. In a railroad car, a car frame comprising a drop center frame portion and raised end frame portions; trucks positioned underneath said raised end frame portions; vestibule means comprising sides and roof supported above said trucks and said raised end frame portions; movable loading platform means operatively disposed on said drop center car frame portion; means supporting said loading platform for movement on said drop center car frame portions whereby an end portion of said loading platform may be positioned at the side of the car in a position to receive or discharge a wheeled load from the side of the car; and a car body comprising sides and roof secured to and movable with said loading platform relative to the remainder of the car, said car body being open at the ends and substantially registering with said vestibule means when the loading platform is in load carrying position on the car frame.

4. In a railroad car, a car frame comprising two end frame portions supported on car trucks by means permitting a limited sidewise tilting movement of the car frame on the car trucks and a drop center frame portion positioned between said two end frame portions in a plane below said two end frame portions; track means comprising transverse track devices on said drop center frame portion and folding extension track members pivotally connected with the end portions of said transverse track devices and movable between positions alongside of said drop center frame portion and extended positions in prolongation of said transverse track devices; a loading platform supported for movement on said transverse track devices and said extension track members when said extension track members are in extended position and adjustable supporting means operatively connected with said extension track members supporting portions of said extension track members and providing means for positioning said track means at an incline to facilitate movement of the loading platform on the track means.

5. In a railway car, a drop center car frame portion; transverse track means on said drop center car frame portion; track extension means operatively connected with said drop center car frame portion adapted when in extended position to project outwardly from the side of the drop center car frame portion, supporting means connected with the outer end portions of said track extension means; and a loading platform carried on said drop center car frame portion and movable between a load carrying position on said drop center car frame portion and a load receiving and load discharging position in which a portion of said loading platform is positioned at one side of the car, a portion of said loading platform being supported principally on said transverse track means when said loading platform is in load carrying position above the drop center car frame portion and being supported principally on said track extension means when said portion of said loading platform is moved into a load receiving and load discharging end position at one side of the car.

6. In a railroad car, a drop center car frame portion; a loading platform extending substantially throughout the entire length of said drop center car frame portion when it is positioned parallel therewith; pivot means positioned near one end of said drop center car frame portion pivotally connecting one end portion of the loading platform with the drop center car frame portion leaving the other end portion of the loading platform free to move angularly on said pivot means and sidewise relative to the car frame; extensible track means attached to said car frame positioned to support said movable end of said loading platform when said loading platform is being moved transversely of the car frame or is in a position to receive or discharge a load; a support for the outer end portion of said extension track means; and platform moving means connected with said loading platform.

7. In a railroad car, a car frame; movable loading platform means operatively disposed on said car frame; track means on said car frame movably receiving said loading platform; folding track extension members connected with said car frame and foldable alongside of said car frame and adapted when extended to support portions of said loading platform at the side of said car frame when said portions of said loading platform are moved into loading and unloading position at the side of the car frame; and supporting means for the outer end portions of said folding track extension members.

8. In a railroad car, a car frame a loading platform supported on said car frame when in a posion parallel therewith; pivot means connecting one end portion of said loading platform with said car frame leaving the other end portion of said loading platform free to move angularly on said pivot means and sidewise relative to the car frame; extensible track means attached to said car frame and positioned to support said movable end of said loading platform when said loading platform is being moved transversely of the car frame or is in a position at the side of the car frame; a support for the outer end portion of said extension track means; and platform moving means connected with said loading platform.

9. In a railroad car, a car frame comprising a drop center frame portion and two elevated end frame portions positioned in a plane above the drop center frame portion; a reinforcing thrust frame member extending longitudinally of the car frame between the two elevated end portions and pivotally connected with the car frame; and a loading platform positioned on the drop center frame portion and pivotally connected therewith.

10. In a railroad car, a car frame comprising a drop center frame portion and two elevated end frame portions positioned in a plane above the drop center frame portion; two loading platforms positioned on said car frame in end to end relation and angularly movable into loading and unloading positions; pivot means connecting end portions of said loading platforms with said car frame; and thrust members carried by said loading platforms and extending longitudinally of the car frame above the plane of the drop center portion when the two loading platforms are in alignment with the car frame and adapted to withstand longitudinal stresses.

11. A drop center car frame comprising a drop center frame portion adapted to carry a vertical load and two elevated end frame portions positioned in a plane above the drop center frame portion; and articulate truss members movable relative to said car frame to provide for side loading and unloading, said articlulate truss members extending longitudinally of the car frame above the drop center car frame portion when the car is carrying a load and acting as a chord in a truss in cooperation with said drop center car frame portion to support vertical load, said articulate truss members also acting both in compression and tension to withstand longitudinal stresses.

12. A drop center car frame comprising a drop center frame portion adapted to carry a vertical load and two elevated end frame portions positioned in a plane above the drop center frame portion; a loading platform operatively connected with said drop center car frame portion for movement between a load carrying position and a side loading and unloading position; and articulate truss members movable relative to said car frame to provide for side loading and unloading, said articulate truss members extending longitudinally of the car frame above the drop center frame portion when the loading platform is in load carrying position and acting as a chord in a truss in cooperation with said drop center car frame portion to support vertical load, said articulate truss members also acting in both compression and tension to withstand longitudinal stresses.

JAY C. SMITH.